United States Patent [19]

Steere, Jr.

[11] 4,420,909
[45] Dec. 20, 1983

[54] WAFERING SYSTEM

[75] Inventor: Robert E. Steere, Jr., Boonton, N.J.

[73] Assignee: Silicon Technology Corporation, Oakland, N.J.

[21] Appl. No.: 320,097

[22] Filed: Nov. 10, 1981

[51] Int. Cl.³ .............................................. B24B 7/20
[52] U.S. Cl. .............................. 51/73 R; 51/215 UE; 51/235; 51/283 R; 125/13 R
[58] Field of Search ................ 51/73 R, 235, 215 UE, 51/283 R; 125/15, 13 R

[56]  References Cited
U.S. PATENT DOCUMENTS 3,039,235  6/1962  Heinrich .............................. 51/73 R
3,577,861  5/1971  Bender ................................. 51/73 R

FOREIGN PATENT DOCUMENTS 1319768  6/1973  United Kingdom .............. 51/73 R

Primary Examiner—Harold D. Whitehead
Attorney, Agent, or Firm—Kenyon & Kenyon

[57]  ABSTRACT

The wafering system employs a chuck assembly for moving a severed wafer from a crystal through the aperture in the cutting blade to a take-off conveyor. The chuck assembly includes a suction head which is pivotally mounted via a pivot arm assembly, a slide for moving the head back and forth and a carriage for vertically moving the head up and down. A motor is used to actuate the carriage while air cylinders are used to actuate the slide and pivot arm assembly.

26 Claims, 18 Drawing Figures

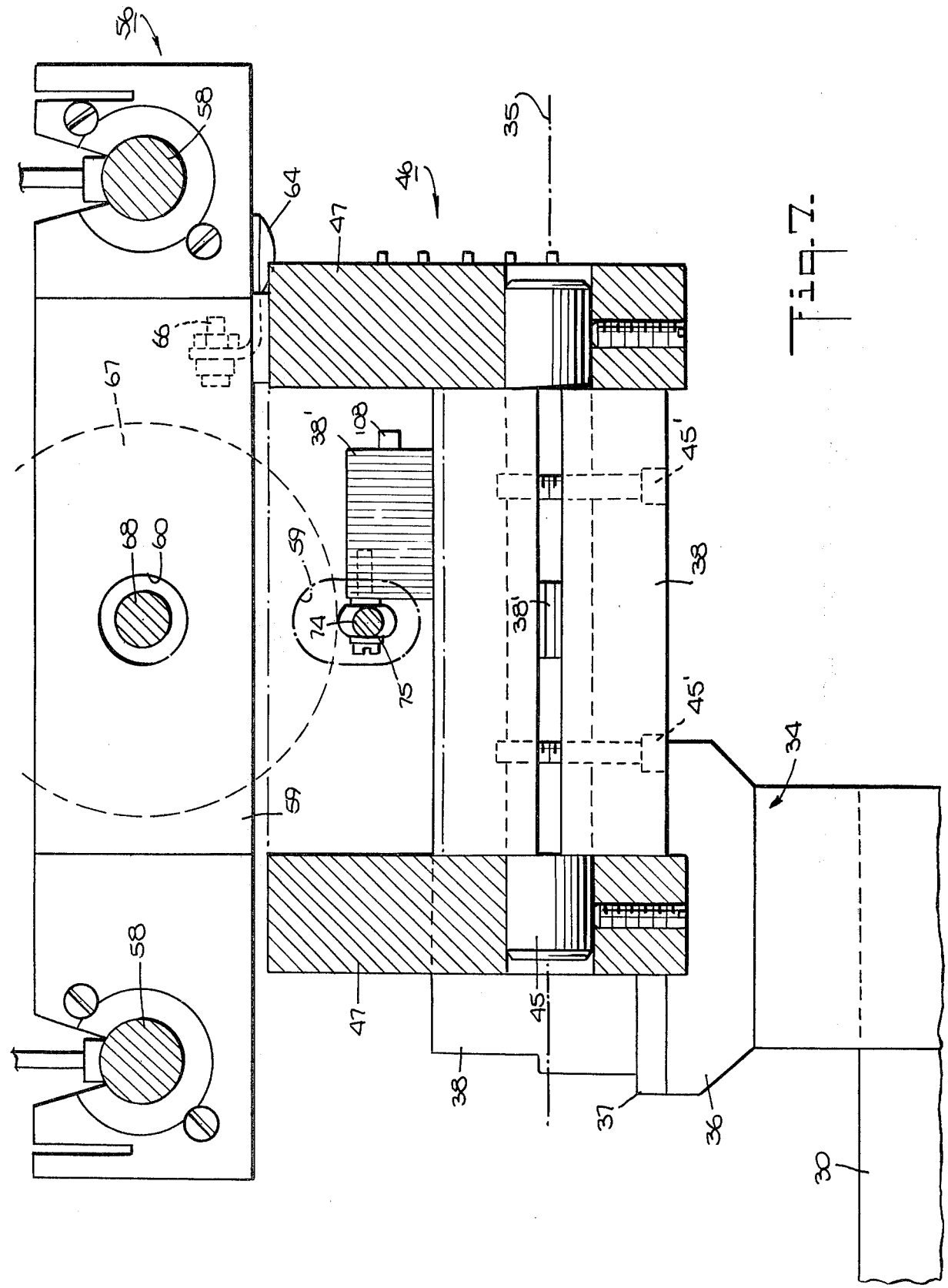

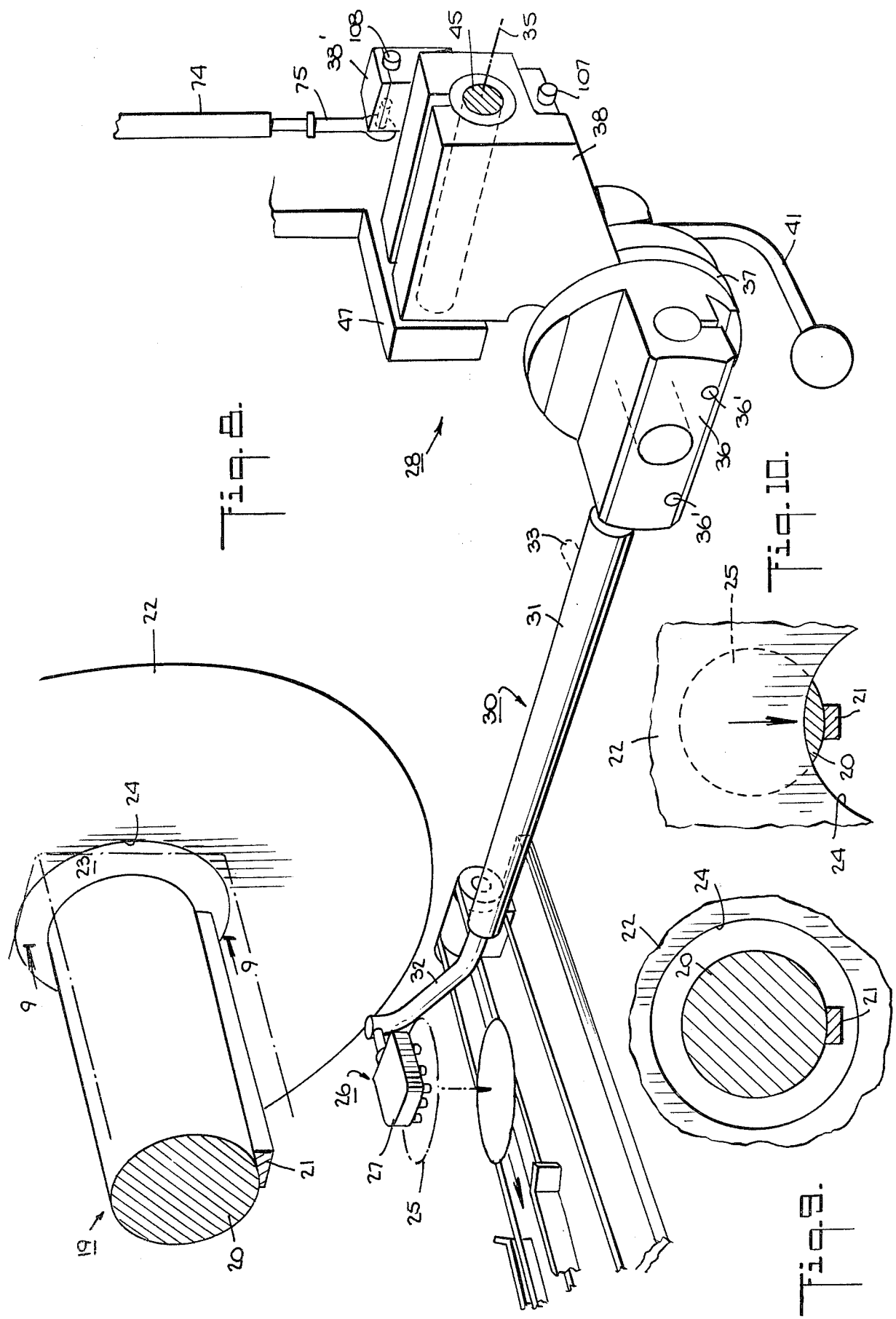

WAFERING SYSTEM

This invention relates to a wafering system. More particularly, this invention relates to a chuck assembly for removing a severed wafer from an ingot. Still more particularly, this invention relates to a method of severing and removing a wafer from an ingot.

As is known, various types of systems have been known for slicing wafers of material from an ingot, such as a crystal, in an exact manner. Generally, the crystals are of a type such as silicon, germanium, and the like, which can be used in the semi-conductor industry. In such cases, the wafers which are severed from the crystal must be accurately made and must have smooth surfaces.

In the past, various types of machines have been provided for the cutting of a crystal, for example of cylindrical shape, into thin disk-like wafers. Many of these cutting machines have employed an annular member which is provided with a circular opening, the edge of which is formed as a cutting edge. In such a machine, the crystal is positioned within the cutting edge and a wafer is severed either by moving the crystal relative to the annular member or by moving the annular member relative to the crystal. However, while these machines have been able to accurately and smoothly sever a wafer from a crystal, handling of the severed wafer has not always been reliable. For example, as described in U.S. Pat. No. 3,577,861, with a crystal oriented in a vertical position and the annular cutting member positioned in a horizontal plane, it has been known to employ a retrieval system which has one suction member below the crystal and cutting member for initially receiving and holding a severed wafer and a second suction member above the annular member out of the plane of the crystal to receive the severed wafer from the first suction member. Such a retrieval system, however, requires the timing and the accurate positioning of a multiplicity of components in order to effect retrieval of a severed wafer from the crystal as well as a number of operations for transferring the severed wafer from one suction member to another.

In other cases, it has been known to dispose the crystal in a horizontal plane with the annular cutting member in a vertical plane. In such cases, one known retrieval system has used a suction member which initially grips a severed wafer and then drops the wafer onto a slide from which the wafer may slide onto a conveyor belt arrangement for conveyance out of the machine. However, in these cases, the wafers can become scratched or broken during movement.

In still other cases, the annular cutting member has been mounted on a hollow shaft so that a severed wafer can be removed through the hollow shaft by a suitable means. However, this creates a cumbersome machine and requires a relatively large space for the machine.

Accordingly, it is an object of the invention to retrieve a severed wafer from an ingot in a relatively simple manner.

It is another object of the invention to sever a wafer from a crystal using a rotary cutting blade having an internal cutting edge about an opening and to remove the severed wafer through the opening in the blade.

It is another object of the invention to reduce the size of a wafering system.

It is another object of the invention to provide a low cost system for severing wafers from a crystal.

It is another object of the invention to reduce the time for severing a wafer from a crystal.

It is another object of the invention to provide a wafering system which can be easily automated with a conveyor pick-up.

It is another object of the invention to provide a wafering system which can be operated by a single operator with the various working components conveniently located for the operator.

Briefly, the invention provides a wafering system which is comprised of a rotary cutting blade having a bore and a cutting edge about the bore for severing a wafer from a delivered ingot, a chuck assembly having a head for engaging a severed wafer from the ingot, and means for moving the head between a rest position on one side of the blade and a wafer holding position on an opposite side of the blade.

The wafering system also includes a means for feeding an ingot perpendicularly into the bore of the cutting blade for slicing of thin wafers from the ingot during a relative transverse movement between the blade and the ingot.

The chuck assembly also includes an arm which is secured to and which extends from the head and an arm assembly which has the arm mounted thereon. In addition, the arm assembly is pivotally mounted on a slide so as to pivot about a first axis. The slide is, in turn, movably mounted on a carriage along a second axis which is perpendicular to the first axis. The carriage, in turn, is movable along a third axis perpendicular to the pivot axis and the axis along which the slide moves. For example, with the ingot disposed in a horizontal plane and the cutting blade disposed in a vertical plane, the carriage is mounted so as to move in a vertical plane along a carriage guide. The slide is then movable via a suitable reciprocating means over a predetermined stroke and the arm assembly is pivotable about a horizontal axis via a suitable means.

The arm of the arm assembly is formed with a straight section which extends from the arm assembly as well as a bent section on which the head is mounted in offset relation to the straight section. The construction is such that the head can be moved into and through the plane of the bore in the cutting blade when a severed wafer is to be retrieved and back through the bore after the wafer has been retrieved. In this regard, a suitable programming means is provided for actuating the various movements of the carriage, slide and arm assembly in sequence.

The invention further provides a method of severing and removing a wafer from an ingot. In this regard, the method includes the steps of positioning the ingot within a bore of a rotary cutting blade having an internal cutting edge, moving the cutting blade transversely relative to the ingot in order to sever a wafer from one end, moving a head of a chuck assembly from a rest position on one side of the blade through the bore to a holding position on an opposite side of the blade and in facing relation to the wafer and thereafter gripping a severed wafer on the head in the holding position. In addition, the method includes the step of moving the gripped wafer and head from the holding position back through the bore in the blade to the resting position and of releasing the wafer from the head at the rest position, for example for conveyance into a shipping cassette.

These and other objects and advantages of the invention will become more apparent from the following detailed description taken in conjunction with the accompanying drawings in which:

FIG. 7 illustrates a view taken on line 7—7 of FIG. 2;

FIG. 8 illustrates a perspective view of a part of the chuck assembly according to the invention;

FIG. 9 illustrates a view taken on line 9—9 of FIG. 8;

FIG. 10 illustrates a view similar to FIG. 9 with a cutting blade near the end of a cutting stroke;

Figure 1:
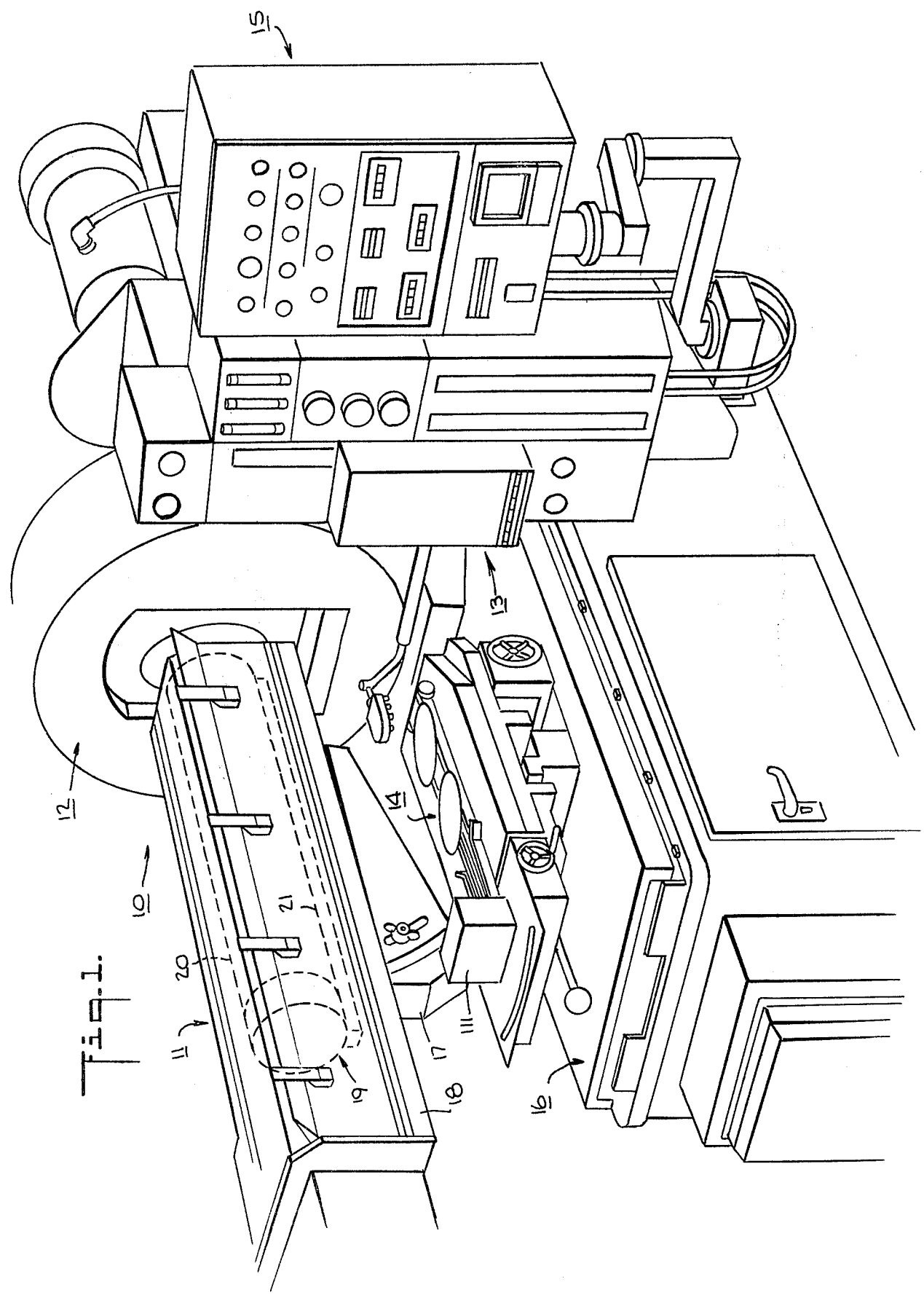
FIG. 1 illustrates a perspective view of a wafering system according to the invention.

Referring to FIG. 1, the wafering system 10 includes an ingot feed means 11, a cutting head 12, a wafer retrieval system 13, a take-off conveyor 14, a control box 15 and a table 16.

Referring to FIG. 1, the ingot feed means 11 includes a mounting bracket or pedestal 17 which is mounted on the table 16 in an offset manner relative to the cutting head 12. In addition, the feed means 11 includes an ingot box 18 which is mounted in cantilevered relation to the mounting bracket 17 and in alignment with the cutting head 12. The ingot box 18 includes a known means for moving and positioning an ingot 19 for cutting purposes. As indicated, the ingot is formed of a crystal 20 of cylindrical shape and a mounting beam 21 on which the crystal 20 is mounted in known manner. For example, the crystal 20 may be made of silicon while the mounting beam 21 is made of graphite. Alternatively, the crystal 20 may be of any other suitable shape.

Referring to FIG. 8, the cutting head 12 is of conventional construction and serves as a means to mount a rotary cutting blade 22 having a bore 23 and an internal cutting edge 24 about the bore 23 in a cutting position. The cutting head 12 also includes a means (not shown) for moving the blade 22 in a vertical plane transversely of the plane of the crystal 20. As indicated in FIG. 10, the cutting blade 22 serves to sever a wafer 25 of disk-like shape from the crystal 20.

Referring to FIG. 1, and FIG. 8 the wafer retrieval system 13 includes a chuck-assembly 26 having a head 27 for engaging a severed wafer (not shown) from the crystal 20 and means 28 for moving the head 27 between a rest position (as shown) on one side of the blade 22 and a holding position (not shown) on an opposite side of the blade 22 with the head 27 in facing relation to the crystal 20 for holding a severed wafer thereat.

Referring to FIG. 8, the head 27 is of block-like construction and includes a plurality of nozzles 29 on one face through which a vacuum can be drawn in order to grip and hold a severed wafer on the head 27. For example, the nozzles 29 are disposed in three rows with three nozzles in each row.

The means for moving the head 27 includes an arm 30 having a straight section 31 and a bent section 32 on which the head 27 is mounted in offset relation to the straight section 31. In addition, the arm 30 includes a bore which communicates at one end with the nozzles 29 and at the opposite end with a spigot 33 on the straight section 31 to which a suitable vacuum source (not shown) is connected via a flexible tubing (not shown) As shown, the arm 30 is secured in an arm assembly 34 which is pivotally mounted about a horizontal axis 35.

Figure 2:
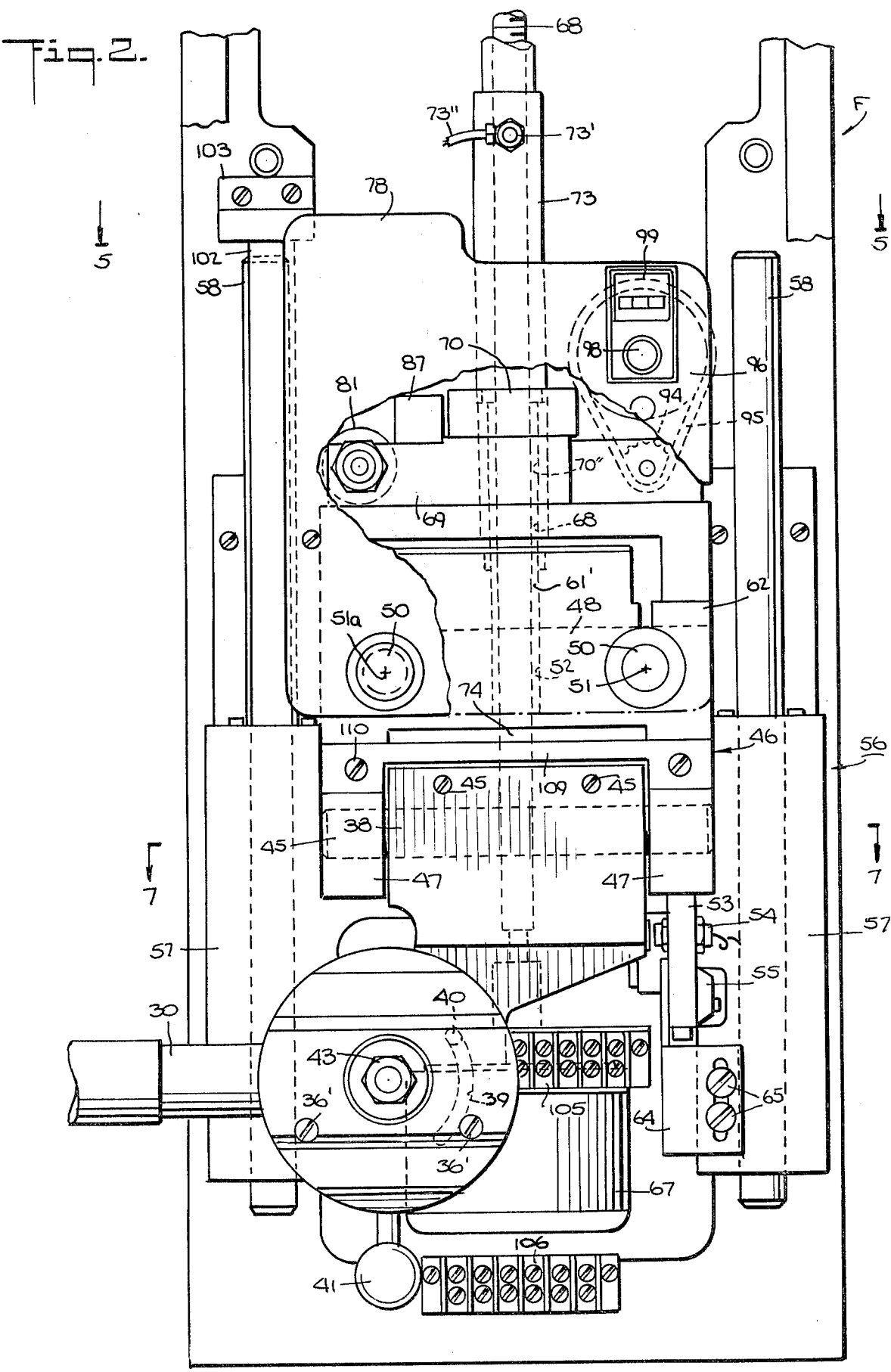
FIG. 2 illustrates a front view of a part of the wafering system in accordance with the invention.
Figure 3:
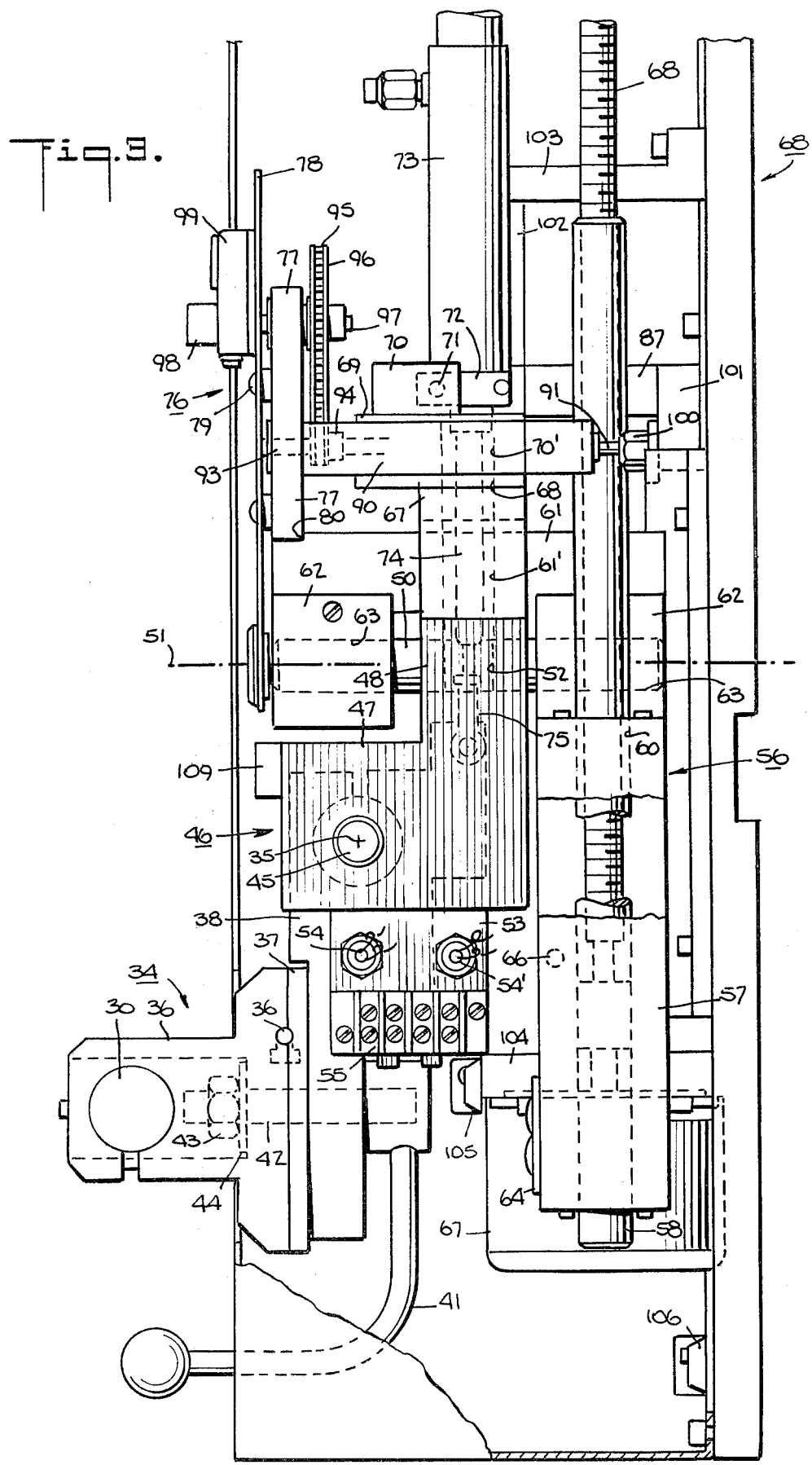
FIG. 3 illustrates a side view of the components of FIG. 2 of the wafering system in the rest position.

Referring to FIGS. 2, 3 and 8, the arm assembly 34 includes a mounting block 36 of split construction in which the arm 30 is securely clamped via clamping bolts 36'. The mounting block 36 abuts an index plate 37 which, in turn, is mounted via screws (not shown) to an arm pivot block 38. The mounting block 36 also carries three positioning detented dowel pins 36" (only one of which is shown in FIG. 3) each of which is exposed to project into one of three radial slots (not shown) in the index plate 37 for positioning the mounting block 36. The index plate 37 also includes an arcuate slot 39 (see FIG. 2) in which a pin 40 secured in the mounting block 36 slides. In addition, a bolt 42 passes through suitable bores in the mounting block 36, index plate 37 and pivot block 38 and carries a locking nut 43 and washer 44 for fixing of the mounting block 36 to the pivot block 38 and index plate 37. A manually movable arm 41 is also secured to the bolt 42 such that the mounting block 36 and arm 30 can be pivoted, for example 90° relative to the index plate 37 into a position out of the plane of the cutting blade 22 for maintenance purposes. In this position, the dowel pins 36" ride on the index plate 37.

The arm pivot block 38 is of split construction at the upper end, as viewed, for securement via clamping bolts 45' (FIG. 2) to a rod 45 which is disposed on the horizontal axis 35 (FIG. 9). A suitable bearing sleeve 38' may also be secured between the block 38 and rod 45 to permit rotation of the block 38 on the rod 45.

Referring to FIGS. 2 and 3, the arm assembly 34 is pivotally mounted via the rod 45 in a slide 46. This slide 46 includes a pair of depending legs 47 in which the rod 45 is secured and a connecting piece 48 which bridges over the legs 47. The connecting piece 48 also includes a pair of bores 49 each of which slidably receives a shaft 50 disposed on horizontal axes 51, 51a (see FIG. 2). In addition, the connecting piece 48 has an enlarged vertical bore 52 extending through a midsection thereof for purposes as described below.

Referring to FIGS. 2 and 3, one leg 47 of the slide 46 carries a depending sensor mounting bracket 53 on which a pair of proximity switches 54, 54' are mounted along with a terminal strip 55.

Referring to FIGS. 2 and 3, the shafts 50 on which the slide 46 is slidably mounted are secured in a carriage 56 which is mounted for movement along a vertical axis, as viewed.

The carriage 56 includes a pair of legs 57 which are slidably mounted on a pair of fixed upright rods 58 of a base assembly F of the machine. In addition, a horizontal connecting piece 59 (see FIG. 7) interconnects the two legs 56 and has a vertical bore 60 extending through a mid-point thereof. An upper end of this bore 60 is threaded as indicated in FIG. 3 for purposes as described below.

The carriage 56 also carries a block 61 bolted on the connecting piece 59. This block 61 extends horizontally as viewed in FIG. 3 and has two depending portions 62 in which bores 63 are provided to fixedly receive the respective shafts 50 via suitable bushings 64 (FIG. 2). In addition, the block 61 has a centrally located bore 61' of elongated shape (see FIG. 5).

As shown in FIG. 2, a bracket 64 is secured to a lower end of one carriage leg 57 via screws 65. This bracket 64 carries a magnet 66 for purposes as described below.

Referring to FIGS. 3 and 8, in order to actuate the carriage 56, a means such as a motor 67 is mounted on the base assembly F of the machine and drives a threaded screw 68 which is threaded into the bore 60 of the carriage 56. Thus, upon rotation of the screw 68, the carriage 56 is moved up or down, depending upon the direction of rotation of the screw 68.

Figure 5:
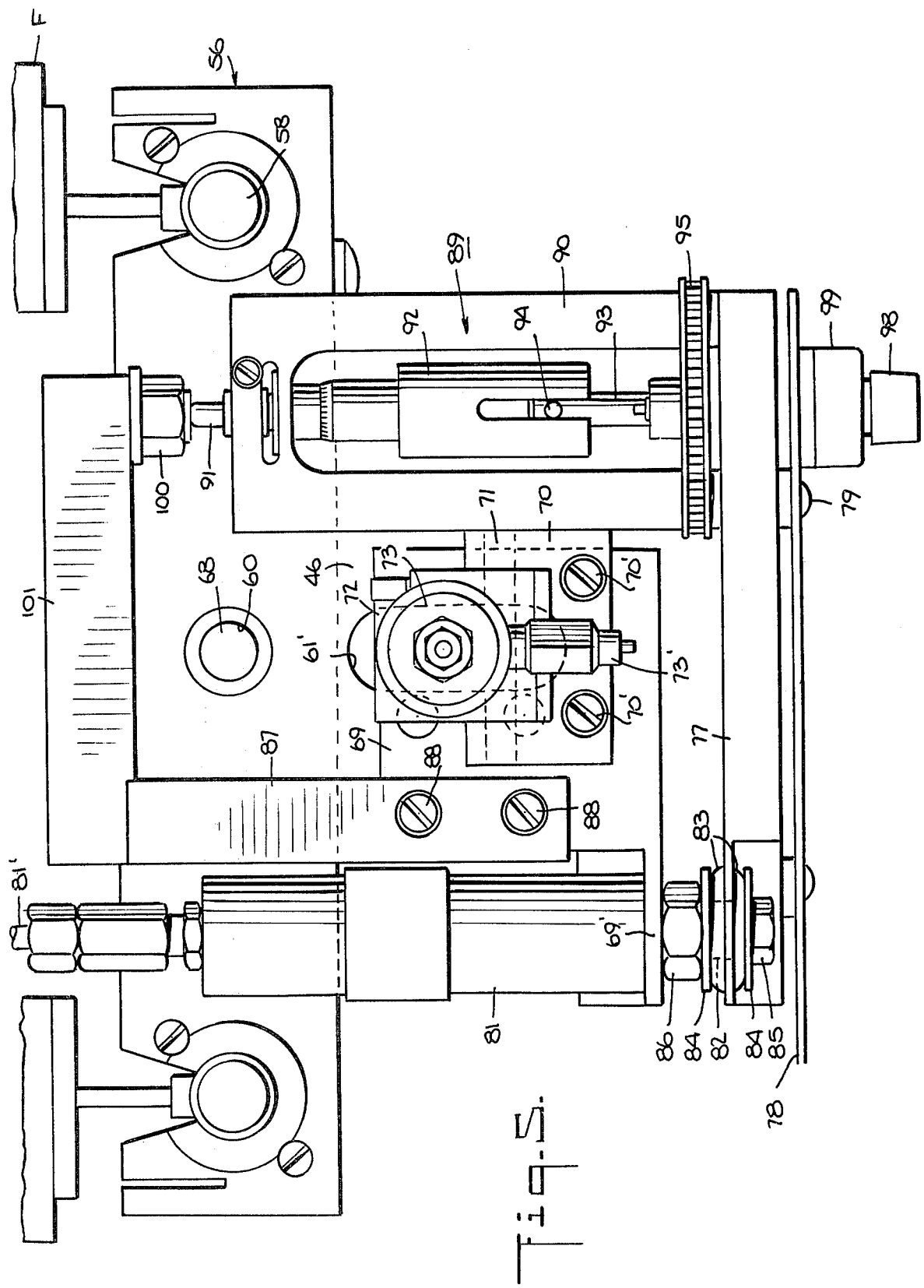
FIG. 5 illustrates a view taken on line 5—5 of FIG. 2.

Referring to FIGS. 2 and 3, the slide 46 carries a bridge-like member 67 which passses over the block 61 of the carriage 56 and through which a bore 67' passes. The bridge-like member 67 also carries a block 69 on the upper surface to which a U-shaped air cylinder base 70 is secured in fixed manner via two screws 70' (FIG. 5). In addition, the air cylinder base 70 has a pivot pin 71 secured therein on a horizontal axis while a U-shaped clamp block 72 is pivotally mounted on the pin 71. As indicated in FIG. 3, the clamp block 72 secures an air cylinder 73 to the block 70 for pivoting about the pivot pin 71. This air cylinder 73 has a rod 74 which passes through a bore 70" in the block 69, the bore 67' in the bridge-like manner 67, the bore 61' in the carriage piece 59 and the bore 52 in the slide 46 into engagement via a rod end joint 75 with the pivot arm assembly 34. As indicated in FIG. 8, the rod end joint 75 is secured to the block 38 via a mounting 38" fixed to the block 38 at a point spaced above the plane of the rod 45. The air cylinder 73 thus serves as a means for pivoting the pivot arm assembly 34 about the axis 35 of the rod 45. To this end, the cylinder 73 has a spigot 73' which is connected via an air hose 73" to a source of air pressure (not shown). When actuated, the cylinder 73 pushes the rod 74 downwardly as viewed in FIG. 2, while the cylinder 73 pivots on the pin 71 and the rod 74 swings in the enlarged bore 52 in the slide 46.

Referring to FIGS. 3 and 5, an adjusting means 76 is also provided for adjusting the slide 46 along the shafts 50 of the carriage 56.

The adjusting means 76 includes a block front 77 to which a face plate 78 is secured via suitable pins 79. The block 77 is bolted to the block 61 by screws (not shown) and, thus, to the carriage 56. As indicated in FIG. 3, the block 61 has a small step 80 in which the block 77 is received. In addition, an air cylinder 81 has a piston rod 82 secured to a recessed portion of the block 77 via grommets 83, washers 84 and a lock nut 85. The cylinder 81, in turn, has an externally threaded stem which passes through a flange 69' of the block 69 and on which a lock nut 86 is threaded to secure the cylinder 81 to the block 69.

In addition, as indicated in FIG. 5, the cylinder 81 is coupled via a line 81' to a source of pressurized air (not shown) so that, when actuated, the cylinder 81 moves away from the block front 77. Likewise, the block 69 which is secured to the cylinder 81, the bridge-like member 67 and the slide 46 move horizontally relative to the block front 77 and carriage 56.

The adjusting means 76 also includes a bracket assembly 87 which is secured via screws 88 to the block 69 and a micrometer assembly 89 for adjustment of the stroke of the cylinder 81 a predetermined amount. As indicated, the micrometer assembly 89 has a U-shaped bracket 90 secured to the block front 77, a pin 91 which is slidably mounted at one end of the bracket 90 and a rotatable sleeve 92 which is secured with the pin 91 in a manner as known to effect a calibrated linear movement of the pin 91 upon rotation of the sleeve 92. In addition, a drive shaft 93 which is coupled with the sleeve 92 via a dowel pin 94 is journalled in the block front 77 (FIG. 3) and is driven via a gear 94 thereon, a chain 95 and a drive gear 96. The drive gear 96 is fixed to a shaft 97 which is rotatably mounted in the block front 77 and to which a manual knob 98 is secured. As indicated in FIG. 3, the knob 98 is located to the outside of the face plate 78 and the shaft 97 is suitably coupled to a counter 99.

As shown in FIG. 5, the pin 91 of the micrometer assembly 89 engages against a stop 100 which is secured to a bracket 101 which, in turn, is secured as by a screw (not shown) to the bracket 87.

Referring to FIGS. 2 and 3, the frame F also carries a tube 102 through which various electrical lines for the system pass. The tube 102 is secured at an upper end in a bracket 103 which serves as a vertical carriage stop and which is bolted to the frame F. At the lower end, the tube 102 is secured in a holder 104 (see FIG. 3) which mounts the motor 67 as well as a sensor bracket (not shown) and a bumper (not shown) which functions as a lower carriage stop. The holder 104 also carries a terminal strip 105. In like manner, the frame F also carries a further terminal strip 106 (see FIG. 2).

The wafering system 10 is also provided with various means to sense the position of the various movable components and, thus, insure an accurate sequencing of the movements. To this end, as shown in FIG. 8, the pivotal arm assembly 34 has a magnet 107 on the pivot block 38 and a magnet 108 on the mounting 38". The magnet 107 cooperates with the left-hand switch 54, as viewed in FIG. 3, to indicate when the arm assembly 34 is in a rest or down position while the magnet 108 cooperates with the right-hand switch 54' to indicate when the arm assembly 34 is in a fully pivoted position as in FIG. 4. Likewise, the magnet 66 on the carriage leg 57 cooperates with a proximity switch (not shown) on the motor holder 104 to indicate when the carriage 56 is in a down or rest position.

Suitable bumpers (not shown) may also be used to ensure stopping of a movable component at the terminal positions of each. For example, as shown in FIG. 2 a stop bar 109 is secured across the slide 46 via screws 110 to limit a return pivot action of the pivotal arm assembly 34.

Figure 6:
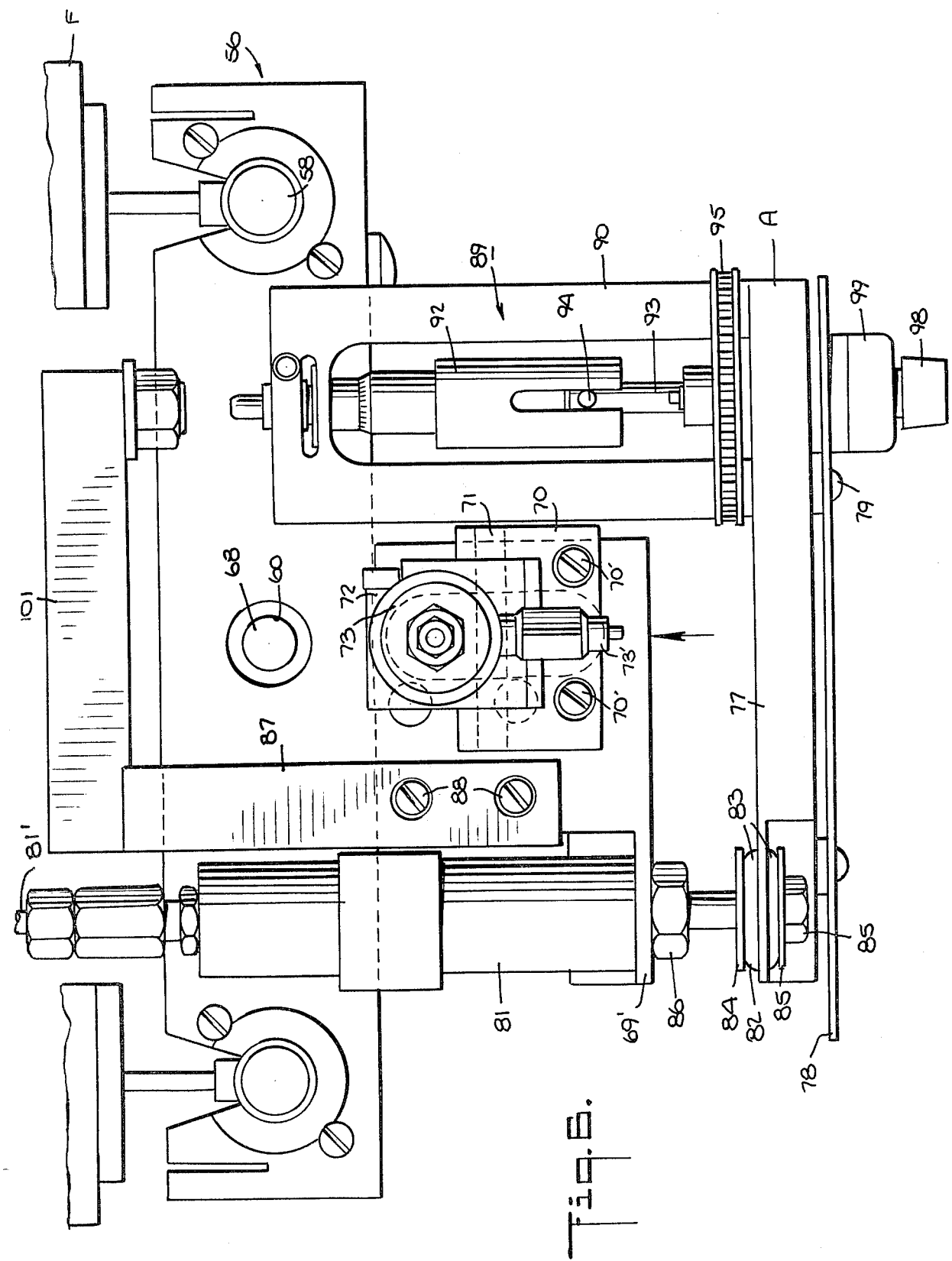
FIG. 6 illustrates a view similar to FIG. 5 with the system in a position spaced from the holding position.

Referring to FIG. 6, in order to set the wafering system 10 for a retrieving operation, the slide 46 is moved so as to space the stop 100 from the micrometer pin 91. The knob 98 is then turned to dial in a set amount on the counter 99 representative of the thickness of wafer required e.g. 0.015 inches and a small gap, e.g. 0.010 inches. The slide 46 is then returned to the rest position with the stop 100 abutting the pin 91.

Figure 11:
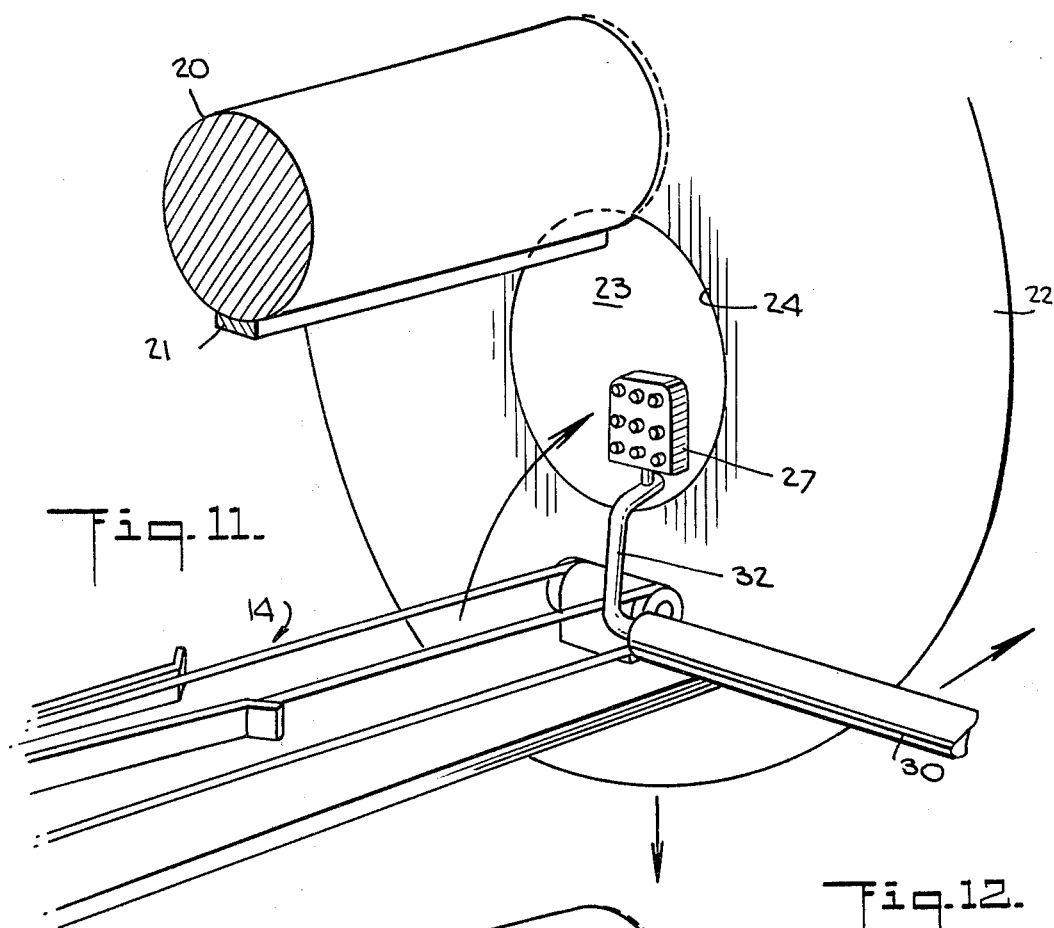
FIG. 11 illustrates a part perspective view of the head of the chuck assembly pivoted and slid back from the rest position.
Figure 12:
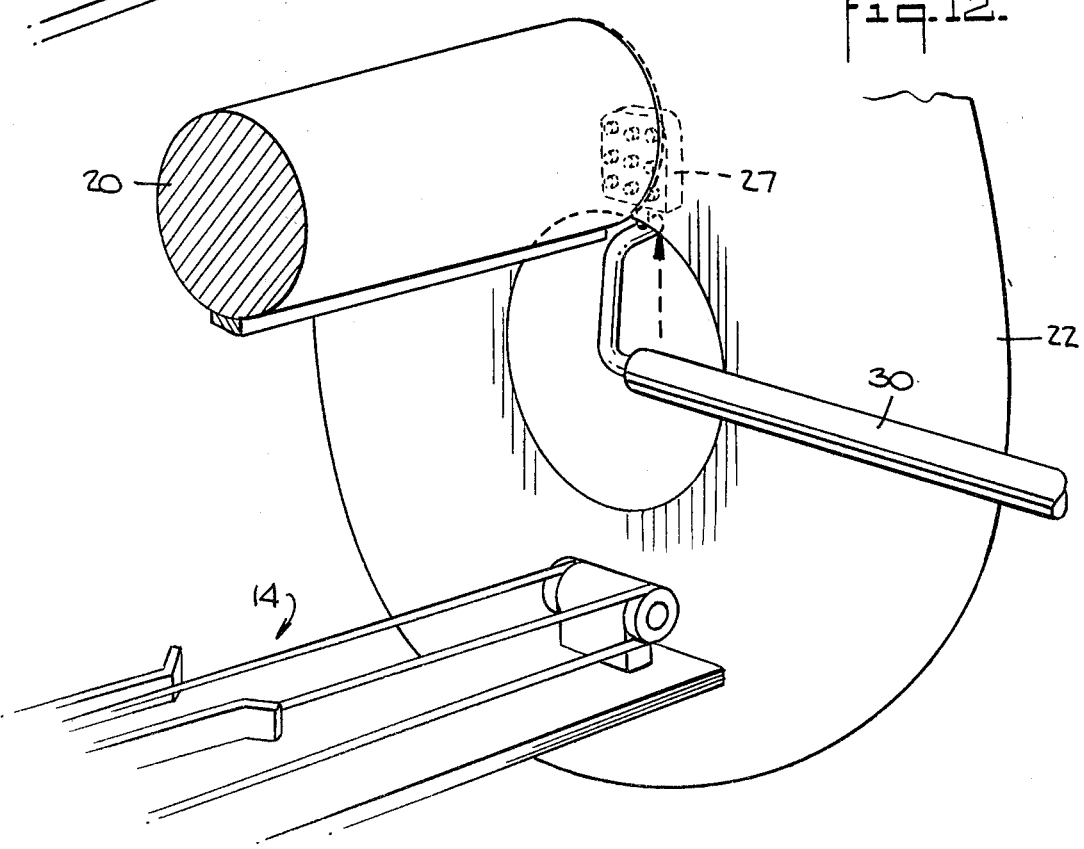
FIG. 12 illustrates a part perspective view of the head raised into a position facing a crystal.
Figure 13:
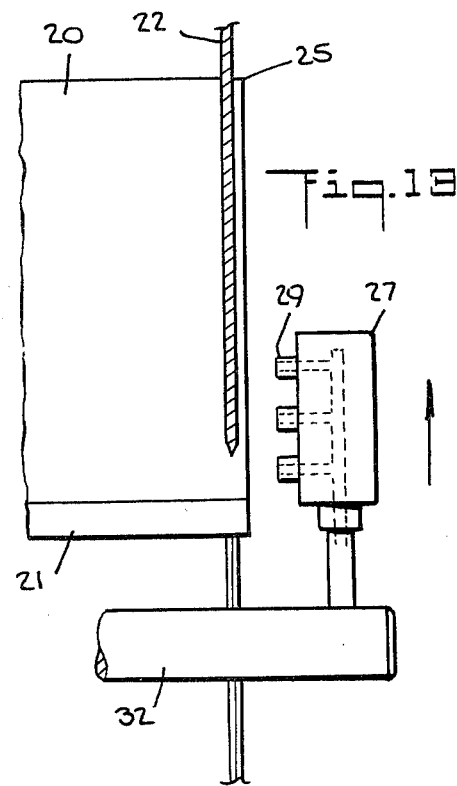
FIG. 13 illustrates a side view of the position illustrated in FIG. 12.
Figure 14:
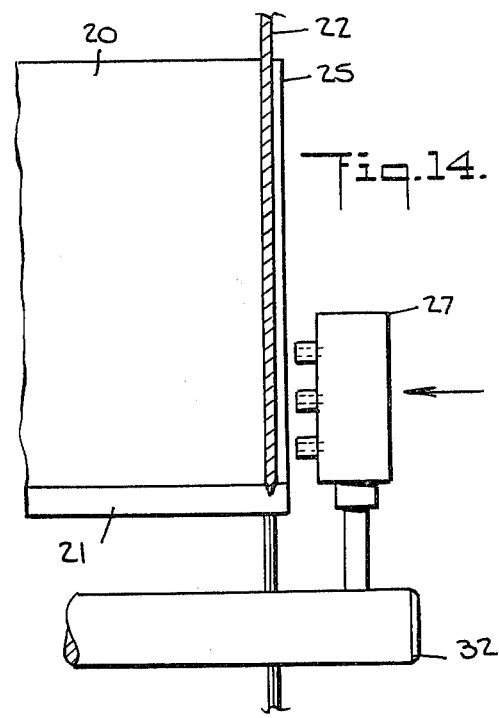
FIG. 14 illustrates a side view of the head in a holding position slightly spaced from a wafer being severed.
Figure 15:
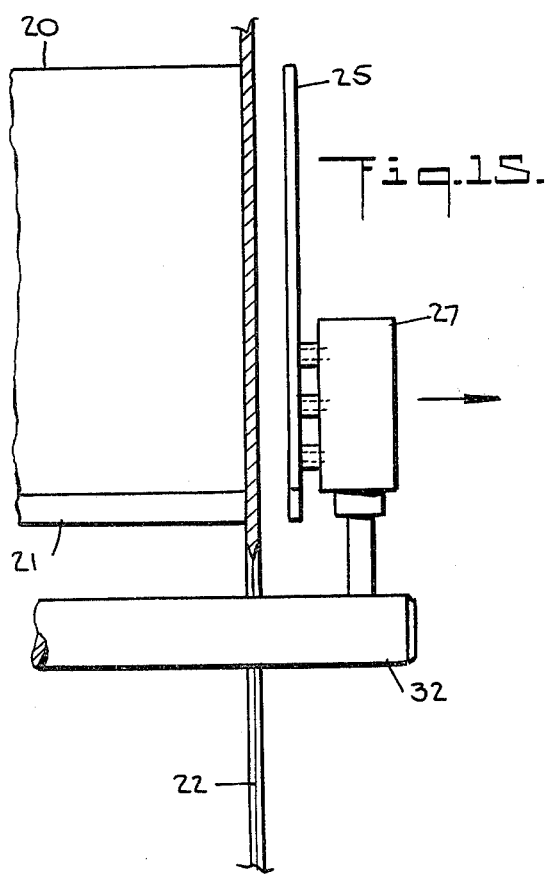
FIG. 15 illustrates a position of the head after retrieving a severed wafer during a slide back from the holding position.
Figure 16:
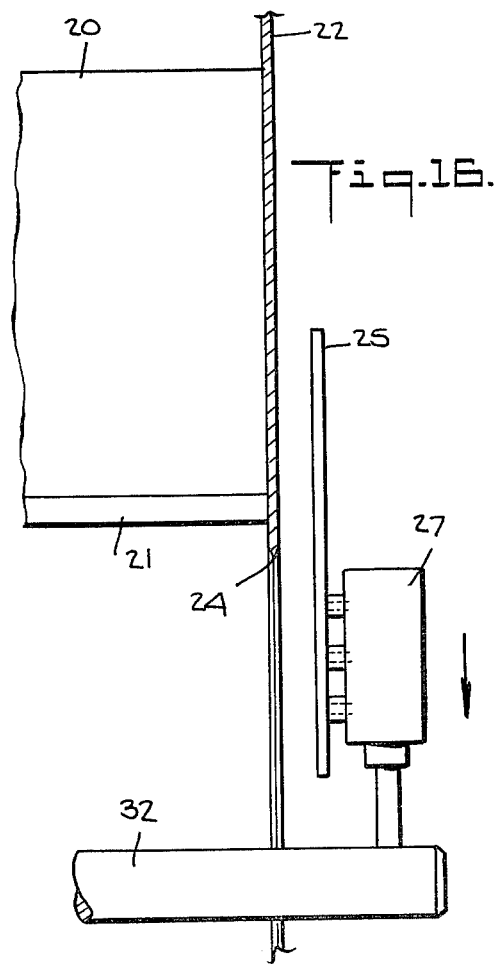
FIG. 16 illustrates a side view of the head during a downward stroke in the carriage in accordance with the invention.
Figure 17:
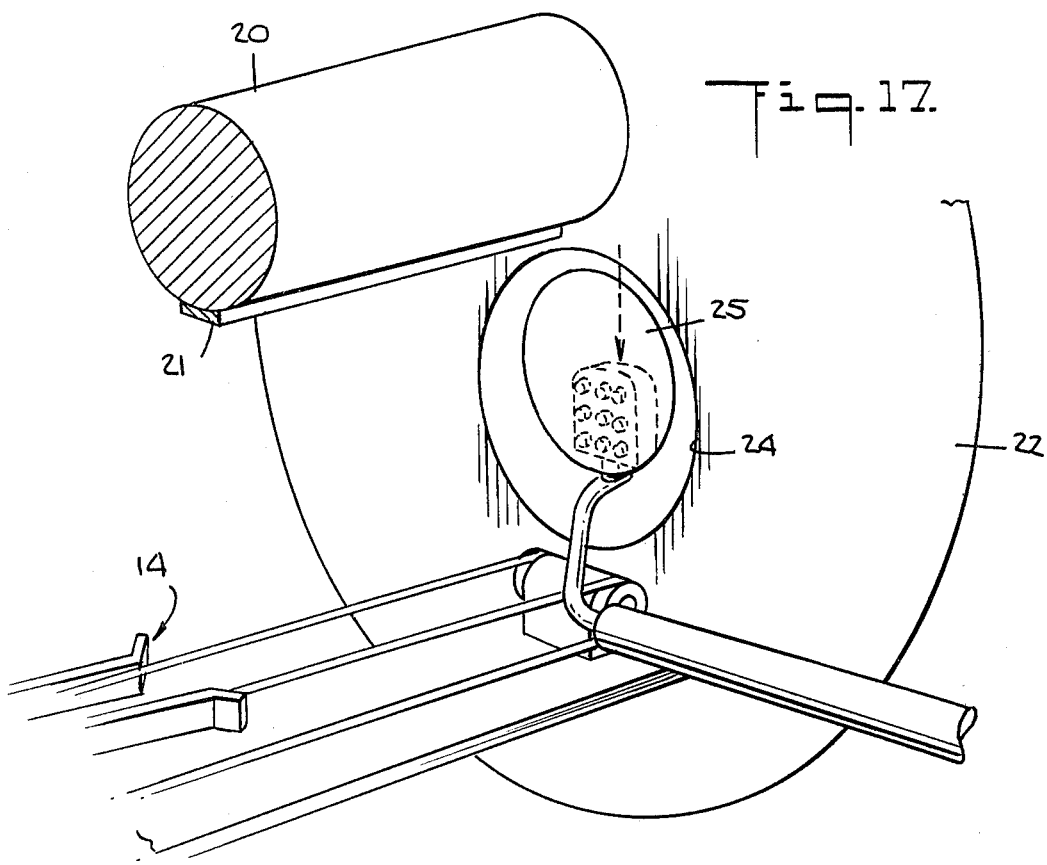
FIG. 17 illustrates a part perspective view of the head of the chuck assembly and a retrieved wafer in a position for passage through the cutting blade.
Figure 18:
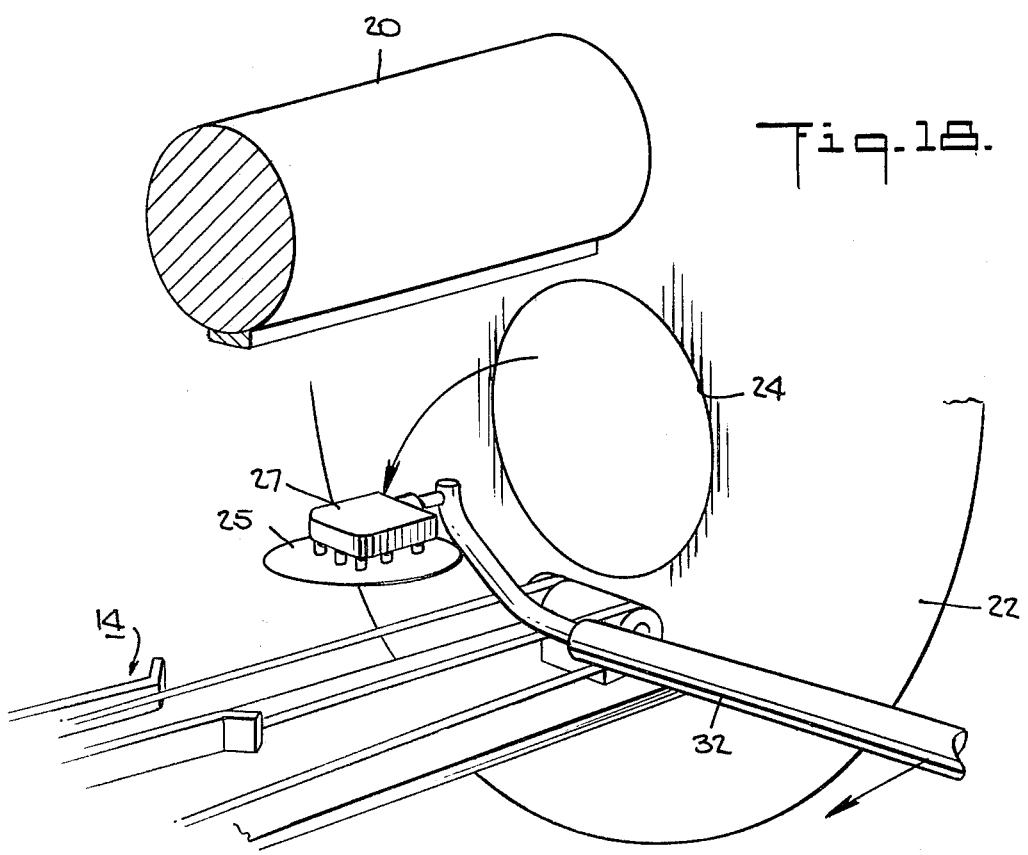
FIG. 18 illustrates a part perspective view of the head of the chuck assembly with the retrieved wafer in the rest position.

Referring to FIGS. 11 to 18, during operation, the wafering system operates so that the blade 22 cuts through the crystal 20 toward a point short of complete severance (FIG. 11). At this time, the arm assembly 30 is pivoted from the rest position illustrated in FIG. 8 by an amount sufficient to pass the head 27 through the opening 23 in the blade 22 (FIG. 11) while the slide 46 is simultaneously moved back. Thereafter, as the blade 22 continues to rotate, the head 27 is raised vertically as shown in FIGS. 12 and 13. In this latter position, the head 27 is spaced from the wafer being severed from the crystal. Next, the head 27 is moved toward the wafer as governed by the dialed-in gap so that the nozzles 29 are spaced from the wafer 25 (FIG. 14). At this time, a limit switch (not shown) then turns on a vacuum so that the wafer 25 is gripped. However, the blade has not yet cut through the entire mounting beam 21. Continued rotation of the blade 22 causes complete severing of the wafer 25. The head 27 is then moved back away from the crystal 20 as indicated in FIG. 15 to move the wafer 25 clear of the crystal 20. Coincidentally, the crystal 20 can be moved away from the blade 22 by a back-off mechanism (not shown). Next, as indicated in FIGS. 16 and 17, the head 27 is moved vertically downwardly so that the wafer 25 is located within the plane of the opening 23 in the blade. Next, the arm assembly 30 is again pivoted to bring the head 27 into the rest position (FIG. 18). In this position, the wafer 25 is located above the take-off conveyor 14. The vacuum to the arm assembly 30 can then be deactivated so that the wafer 25 is gently dropped onto the take-off conveyor 14. The cutting blade 22 then returns to a starting position ready to repeat a cutting cycle.

As indicated in FIG. 1, the take-off conveyor 14 may be provided with a suitable cassette holder 111 in which a plurality of severed wafers 25 can be sequentially stacked for subsequent use and/or shipment.

Figure 4:
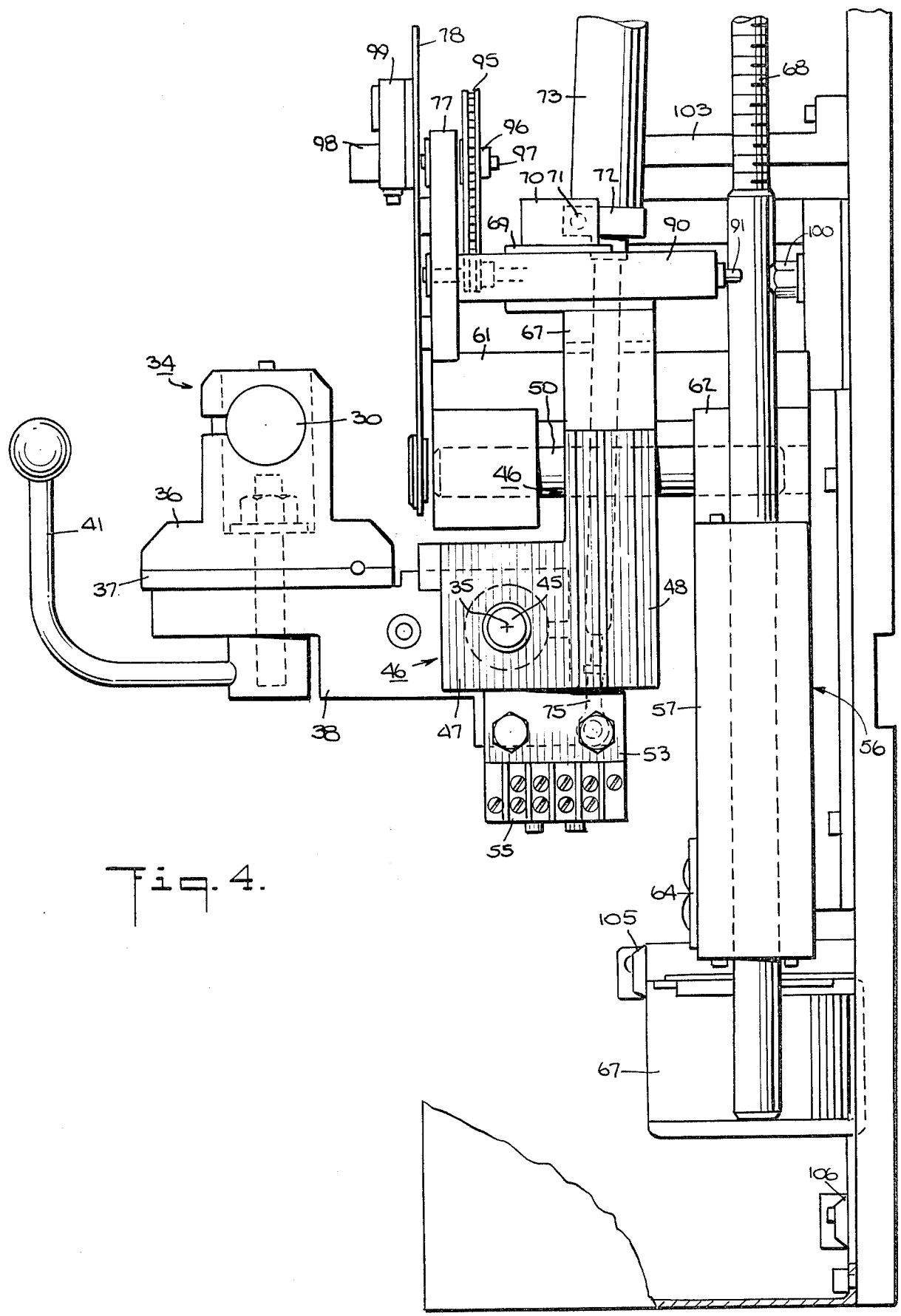
FIG. 4 illustrates a view similar to FIG. 3 with the arm assembly pivoted from a rest position, the slide moved back and the carriage moved upwardly.

When a wafer is to be retrieved, the air cylinder 81 is actuated to move the slide 46 away from the face plate 78 and air cylinder 73 is actuated simultaneously to pivot the arm assembly 34 into the position illustrated in FIG. 4. During this time, the cylinder 73 pivots about the pivot pin 71 into an angular position. Next, the motor 67 is actuated to raise the carriage 56 into an upper position (see FIGS. 4 and 13). The air cylinder 81 is then deactivated to move the slide 46 relative to the carriage 56, for example to the left as viewed in FIG. 4. In this position, the stop 100 moves against the pin 91 of the micrometer assembly 89 (see FIGS. 5 and 14). In this holding position, suction is drawn on the head so that the head 27 is able to remove and hold a severed wafer 25 against the nozzles 29 under a suction force. For example, a head 27 may hold a four inch diameter wafer 25 of a thickness of about 0.010 inch to 0.015 inch in a vertical plane with a force exceeding 5 to 10 pounds lateral pull. In this respect, the wafer 25 can be transferred from the ingot 19 to the vacuum head 27 with a gap setting of, for example, 0.010 inch. A reverse sequence of steps is then carried out to bring the wafer 25 through the cutting blade 22 into the rest position illustrated in FIG. 18.

The invention thus provides a wafering system in which a severed wafer can be quickly and reliably retrieved. Further, the invention provides a wafering assembly in which an operator can view the various working parts from a single working position.

The invention further provides a chuck assembly wherein use is made of a single head for retrieving a severed wafer from a crystal and for transporting the wafer onto a take-off conveyor for subsequent processing.

Of note, once the severed wafer has been passed through the rotary blade, the blade can be returned for a subsequent severing operation. As the time of moving the severed wafer through the blade is relatively minimal, a quick return of the blade occurs.

The wafering system may also be used to sever the ends of the nozzles 29 while mounted on the head 27 by using the slow vertical motion of the carriage 56 with the arm assembly 34 pivoted and moved forward against the pin 91 and with the counter at a preset zero position. This ensures a true plane of the nozzle ends parallel to the face of a wafer being severed in a subsequent operation.

Referring to FIG. 1, the control box 15 contains various controls and a programming means for programming the movement of the motor 67 for reciprocating the carriage 56, the air cylinder 81 for reciprocating the slide 46 and the air cylinder 73 for pivoting the arm assembly 34. The programming means can be of conventional construction and need not be further described.

Further, the various components of the system can be provided with bumpers of resilient nature to effect stoppage of a movable component in a given position.

What is claimed is:
1. A wafering system
   a rotary cutting blade having a bore and a cutting edge about said bore for severing a wafer from a delivered ingot;
   a chuck assembly on one side of said blade having a head for engaging a wafer severed from the ingot; and
   means for moving said head between a rest position on said one side of said blade and a wafer holding position on an opposite side of said blade.
2. A wafering system as set forth in claim 1 which further comprises means for feeding an ingot perpendicularly into said bore from one side of said blade for subsequent slicing of a thin wafer from the ingot during a relative transverse movement between said blade and the ingot.
3. A wafering system as set forth in claim 1 wherein said head includes a plurality of nozzles on one face of said head, a hollow bore extending from said nozzles and a spigot in communication with said bore for attachment to a vacuum source.
4. A wafering system comprising
   a rotary cutting blade having a bore and a cutting edge about said bore for severing a wafer from a delivered ingot;
   a chuck assembly having a head for engaging a severed wafer from the ingot; and
   means for moving said head between a rest position on one side of said blade and a wafer holding position on an opposite side of said blade, said means for moving said head including a carriage, a carriage guide extending tranversely of said blade, means for reciprocating said carriage along said guide, an arm secured to said head, an arm assembly having said arm secured therein and being piv- otally mounted on said carriage, and means for pivoting said arm assembly to move said head through said bore in said blade.

5. A wafering system as set forth in claim 4 wherein said means for moving said head further includes a slide having said arm assembly pivotally mounted thereon, a slide guide mounted on said carriage in a plane perpendicular to said blade, and means for reciprocating said slide on said slide guide a predetermined stroke.

6. A wafering system as set forth in claim 5 which further comprises an adjustable means for adjusting said stroke of said slide.

7. A wafering system as set forth in claim 4 wherein said head includes a plurality of nozzles on one face of said head and said arm has a hollow bore extending from said nozzle on said head and a spigot in communication with said bore for attachment to a vacuum source.

8. A wafering system comprising
a rotary cutting blade having a bore and a cutting edge about said bore;
means for moving said blade in a vertical plane;
feed means for feeding an ingot perpendicularly towards said blade for positioning within said bore of said blade for severing of a wafer therefrom;
a carriage;
means for reciprocating said carriage in a vertical plane;
a slide movably mounted on said carriage in a horizontal plane;
means for reciprocating said slide horizontally of said carriage over a predetermined stroke;
an arm assembly pivotally mounted on said slide about a horizontal axis;
means for pivoting said arm assembly;
an arm extending from said arm assembly; and
a head mounted on said arm for pivoting with said arm assembly in a plane perpendicular to said blade, said head having holding means for holding a wafer severed from an ingot.

9. A wafering system as set forth in claim 8 wherein said holding means includes a plurality of nozzles on a face of said head and a bore extending through said arm in communication with said nozzles at one end and a vacuum source at an opposite end.

10. A wafering system as set forth in claim 8 wherein said feed means includes a mounting bracket and an ingot box mounted in cantilevered relation to said mounting bracket and in alignment with said bore in said blade.

11. A wafering system as set forth in claim 8 which further comprises an adjustable means for adjusting said stroke of said slide.

12. A wafering system as set forth in claim 8 which further comprises programming means for programming movement of said means for reciprocating said carriage, said means for reciprocating said slide and said means for pivoting said arm assembly.

13. A chuck assembly for a wafering system comprising
a head for releaseably engaging a wafer severed from an ingot,
an arm secured to and extending from said head;
an arm assembly having said arm mounted thereon;
a slide having said arm assembly pivotally mounted thereon about a first axis; and
a carriage having said slide movably mounted thereon on a second axis perpendicular to said first axis, said carriage being movable along a third axis perpendicular to said second axis and said first axis.

14. A chuck assembly as set forth in claim 13 wherein said arm has a straight section extending from said arm assembly and a bent section extending from said straight section, said bent section having said head mounted thereon in offset relation to said straight section.

15. A chuck assembly as set forth in claim 13 which further comprises a first means for pivoting said arm assembly on said slide, a second means for reciprocating said slide relative to said carriage and a third means for reciprocating said carriage along said third axis.

16. A chuck assembly as set forth in claim 15 wherein said first means is an air cylinder mounted on said slide, said second means is an air cylinder mounted on said carriage and said third means includes a motor and a threaded screw rotatably connected to said motor and in threaded engagement with said carriage.

17. A chuck assembly as set forth in claim 16 which further comprises programming means for actuating said first means, said motor and said second means in sequence.

18. A chuck assembly as set forth in claim 13 which further comprises an adjustable means for adjusting the movement of said slide relative to said carriage.

19. A chuck assembly as set forth in claim 18 wherein said adjustable means includes a manually operable micrometer.

20. In combination,
a cutting head for mounting a rotary cutting blade having an internal cutting edge in a cutting position for severing a wafer from a delivered ingot;
a chuck assembly having a head for engaging a severed wafer; and
means for moving said head between a rest position on one side of said cutting position and a holding position on an opposite side of said cutting position in facing relation to the ingot for holding a severed wafer thereat.

21. The combination as set forth in claim 20 wherein said head includes a plurality of vacuum nozzles for abutting and holding a severed wafer thereon under a vacuum force.

22. The combination as set forth in claim 20 which further comprises a take-off conveyor at said rest position for receiving a severed wafer from said head.

23. A method of severing and removing a wafer from an ingot, said method comprising the steps of
positioning the ingot within a bore of a rotary cutting blade having an internal cutting edge about the bore;
moving the cutting blade transversely relative to the ingot to sever a wafer from one end thereof;
moving a head of a chuck assembly from a rest position on one side of the blade through the bore to a holding position on an opposite side of the blade and in facing relation to the wafer;
gripping a severed wafer on the head in said holding position;
moving the gripped wafer and head from said holding position through the bore to said rest position; and
releasing the wafer from the head.

24. A method as set forth in claim 23 which further comprises the step of conveying a released wafer into a shipping casette.

25. A method as set forth in claim 23 wherein the head is moved from said holding position axially of the ingot with a wafer thereon immediately prior to movement to said rest position.

26. A method of severing and removing a wafer from an ingot, said method comprising the steps of positioning the ingot within a bore of a rotary cutting blade having an internal cutting edge about the bore;

effecting a relative transverse movement between the blade and the ingot to sever a wafer from one end of the ingot;

moving a head of a chuck assembly from a rest position on one side of the blade through the bore of the blade to a holding position on an opposite side of the blade and in facing relation to the wafer;

gripping a severed wafer on the head in said holding position;

moving the gripped wafer and head from said holding position through the bore to said rest position; and releasing the wafer from the head.

* * * * *

REEXAMINATION CERTIFICATE (1153rd)
United States Patent [19]
Steere, Jr.

[11] B1 4,420,909
[45] Certificate Issued Nov. 14, 1989

[54] WAFERING SYSTEM

[75] Inventor: Robert E. Steere, Jr., Boonton, N.J.

[73] Assignee: Silicon Technology Corporation, Oakland, N.J.

Reexamination Request:
No. 90/001,684, Nov. 30, 1988

Reexamination Certificate for:
Patent No.: 4,420,909
Issued: Dec. 20, 1983
Appl. No.: 320,097
Filed: Nov. 10, 1981

[51] Int. Cl.⁴ .............................................. B24B 7/20
[52] U.S. Cl. ................... 51/73 R; 51/215 UE; 51/235; 51/283 R; 125/13 R
[58] Field of Search ............... 51/73 R, 215 UE, 235, 51/283 R; 125/13 R, 15

[56] References Cited
U.S. PATENT DOCUMENTS

| | | | |
|---|---|---|---|
| 2,184,955 | 12/1939 | Gerlach | 51/235 X |
| 3,039,235 | 6/1962 | Heinrich | 51/73 R |
| 3,577,861 | 5/1971 | Bender | 51/73 R |
| 4,228,782 | 10/1980 | Demers et al. | 125/14 |

FOREIGN PATENT DOCUMENTS

| | | | |
|---|---|---|---|
| 53-139686 | 11/1978 | Japan . | |
| 1319768 | 6/1973 | United Kingdom | 51/73 R |

*Primary Examiner*—Robert P. Olszewski

[57] ABSTRACT

The wafering system employs a chuck assembly for moving a severed wafer from a crystal through the aperture in the cutting blade to a take-off conveyor. The chuck assembly includes a suction head which is pivotally mounted via a pivot arm assembly, a slide for moving the head back and forth and a carriage for vertically moving the head up and down. A motor is used to actuate the carriage while air cylinders are used to actuate the slide and pivot arm assembly.

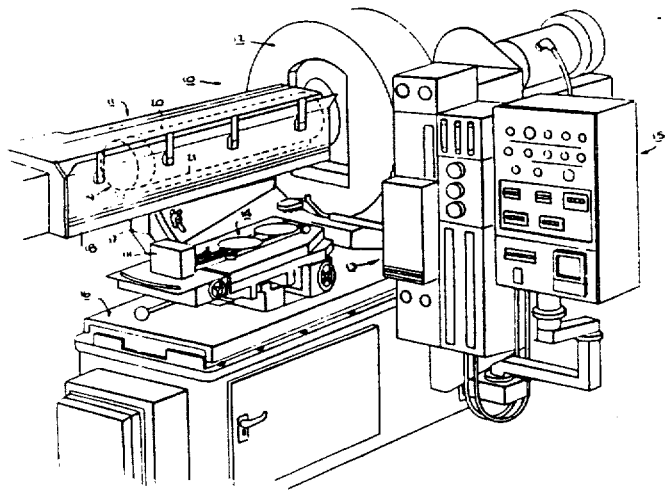

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–19 is confirmed.

Claims 1–3, 20, 22 and 26 are cancelled.

Claims 21 and 23 are determined to be patentable as amended.

Claims 24 and 25, dependent on an amended claim, are determined to be patentable.

New claims 27–39 are added and determined to be patentable.

21. The combination as set forth in claim 20 wherein said head *of said chuck assembly* includes a plurality of vacuum nozzles for abutting and holding a severed wafer thereon under a vacuum force, *said vacuum nozzles projecting from said chuck assembly head to have the ends thereof severed by the cutting blade on said cutting head to ensure a true plane of said ends parallel to a wafer being severed in a subsequent operation.*

23. A method of severing and removing a wafer from an ingot, said method comprising the steps of
  positioning the ingot within a bore of a rotary cutting blade having an internal cutting edge about the bore;
  moving the cutting blade transversely relative to the ingot to sever a wafer from one end thereof;
  moving a head of a chuck assembly from a rest position on one side of the blade through the bore to a *fixed* holding position on an opposite side of the blade and in facing relation to the wafer;
  gripping a severed wafer on the head in said holding position;
  moving the gripped wafer and head from said holding position through the bore to said rest position; and
  releasing the wafer from the head.

*27. A wafering system comprising*
  *a rotary cutting blade having a bore and a cutting edge about said bore for severing a wafer from a delivered ingot; and*
  *a chuck assembly on one side of said blade having a head for engaging a wafer severed from the ingot and means for moving said head in a plane including a central axis of the ingot between a rest position on one side of said blade and a wafer holding position on an opposite side of said blade.*

*28. A wafering system as set forth in claim 27 wherein said positions are angularly disposed over an angle of about 90°.*

*29. A wafering system as set forth in claim 27 which further comprises means for feeding an ingot perpendicularly into said bore on an axis parallel to said plane for slicing of a thin wafer from the ingot during a relative transverse movement between said blade and the ingot.*

*30. A wafering system as set forth in claim 27 wherein said head includes a plurality of nozzles on one face of said head for abutting and holding a severed wafer thereon under a vacuum force, a hollow bore extending from said nozzles and a spigot in communication with said bore for attachment to a vacuum source.*

*31. A wafering system as set forth in claim 27 wherein said blade is vertically disposed and said head is movable in a vertical plane between said positions.*

*32. In combination*
  *a cutting head for mounting a rotary cutting blade having an internal cutting edge in a cutting position for severing a wafer from a delivered ingot; and*
  *a chuck assembly having a head for engaging a severed wafer and means for moving said head in a plane including a central axis of the ingot between a rest position on one side of said cutting position and a holding position on an opposite side of said cutting position in facing relation to the ingot for holding a severed wafer thereat.*

*33. The combination as set forth in claim 32 wherein said head is movable in a vertical plane between said positions and said cutting head is vertically disposed.*

*34. The combination as set forth in claim 32 wherein said head of said chuck assembly includes a plurality of vacuum nozzles having ends in a common plane for abutting and holding a severed wafer thereon under a vacuum force.*

*35. A method of severing and removing a wafer from an ingot, said method comprising the steps of*
  *positioning the ingot within a bore of a rotary cutting blade having an internal cutting edge about the bore;*
  *moving the cutting blade transversely relative to the ingot to sever a wafer from one end thereof;*
  *moving a head of a chuck assembly in a plane including the ingot from a rest position on one side of the blade through the bore to a holding position on an opposite side of the blade and in facing relation to the wafer;*
  *gripping a severed wafer on the head in said holding position;*
  *moving the gripped wafer and head from said holding position through the bore to said rest position; and*
  *releasing the wafer from the head.*

*36. A method as set forth in claim 35 wherein said ingot is positioned on a horizontal axis and said head is moved in a vertical plane including a central axis of the ingot.*

*37. A method as set forth in claim 35 wherein said head is moved over an angle of 90° to pivot through the bore of the blade to and from said rest position.*

*38. A method of severing and removing a wafer from an ingot, said method comprising the steps of*
  *positioning the ingot within a bore of a rotary cutting blade having an internal cutting edge about the bore;*
  *effecting a relative transverse movement between the blade and the ingot to sever a wafer from one end of the ingot;*
  *moving a head of a chuck assembly in a plane including the ingot from a rest position on one side of the blade through the bore of the blade to a holding position on an opposite side of the blade and in facing relation to the wafer;*
  *gripping a severed wafer on the head in said holding position;*
  *moving the gripped wafer and head from said holding position through the bore to said rest position; and*
  *releasing the wafer from the head.*

*39. A method as set forth in claim 38 wherein the blade is moved vertically and the head is moved in a vertical plane including a central axis of the ingot.*

* * * * *

REEXAMINATION CERTIFICATE (3214th)

United States Patent [19]
Steere, Jr.

[11] B2 4,420,909
[45] Certificate Issued Jun. 10, 1997

[54] WAFERING SYSTEM

[75] Inventor: Robert E. Steere, Jr., Boonton, N.J.

[73] Assignee: Silicon Technology Corporation, Oakland, N.J.

Reexamination Request:
No. 90/003,983, Oct. 16, 1995

Reexamination Certificate for:
Patent No.: 4,420,909
Issued: Dec. 20, 1983
Appl. No.: 320,097
Filed: Nov. 10, 1981

Reexamination Certificate B1 4,420,909 issued Nov. 14, 1989

[51] Int. Cl.⁶ .................................................. B24B 7/20
[52] U.S. Cl. ................ 451/180; 451/339; 451/388; 451/339; 451/41; 125/13.02
[58] Field of Search ................................ 451/180, 339, 451/388, 41; 125/13.02, 15, 13.01

[56] References Cited

U.S. PATENT DOCUMENTS

| | | | |
|---|---|---|---|
| 2,184,955 | 12/1939 | Gerlach | 451/388 |
| 3,039,235 | 6/1962 | Heinrich | 451/180 |
| 3,577,861 | 5/1971 | Bender | 451/180 |
| 4,228,782 | 10/1980 | Demers et al. | 125/14 |

FOREIGN PATENT DOCUMENTS

| | | |
|---|---|---|
| 49-20355 | 5/1974 | Japan . |
| 51-126033 | 11/1976 | Japan . |
| 52-5396 | 2/1977 | Japan . |
| 53-19506 | 5/1978 | Japan . |
| 53-107792 | 9/1978 | Japan . |
| 53-139686 | 11/1978 | Japan . |
| 1319768 | 6/1973 | United Kingdom ... 451/180 |

*Primary Examiner*—Robert A. Rose
*Attorney, Agent, or Firm*—McAulay, Fisher, Nissen, Goldberg & Kiel, LLP

[57] ABSTRACT

The wafering system employs a chuck assembly for moving a severed wafer from a crystal through the aperture in the cutting blade to a take-off conveyor. The chuck assembly includes a suction head which is pivotally mounted via a pivot arm assembly, a slide for moving the head back and forth and a carriage for vertically moving the head up and down. A motor is used to actuate the carriage while air cylinders are used to actuate the slide and pivot arm assembly.

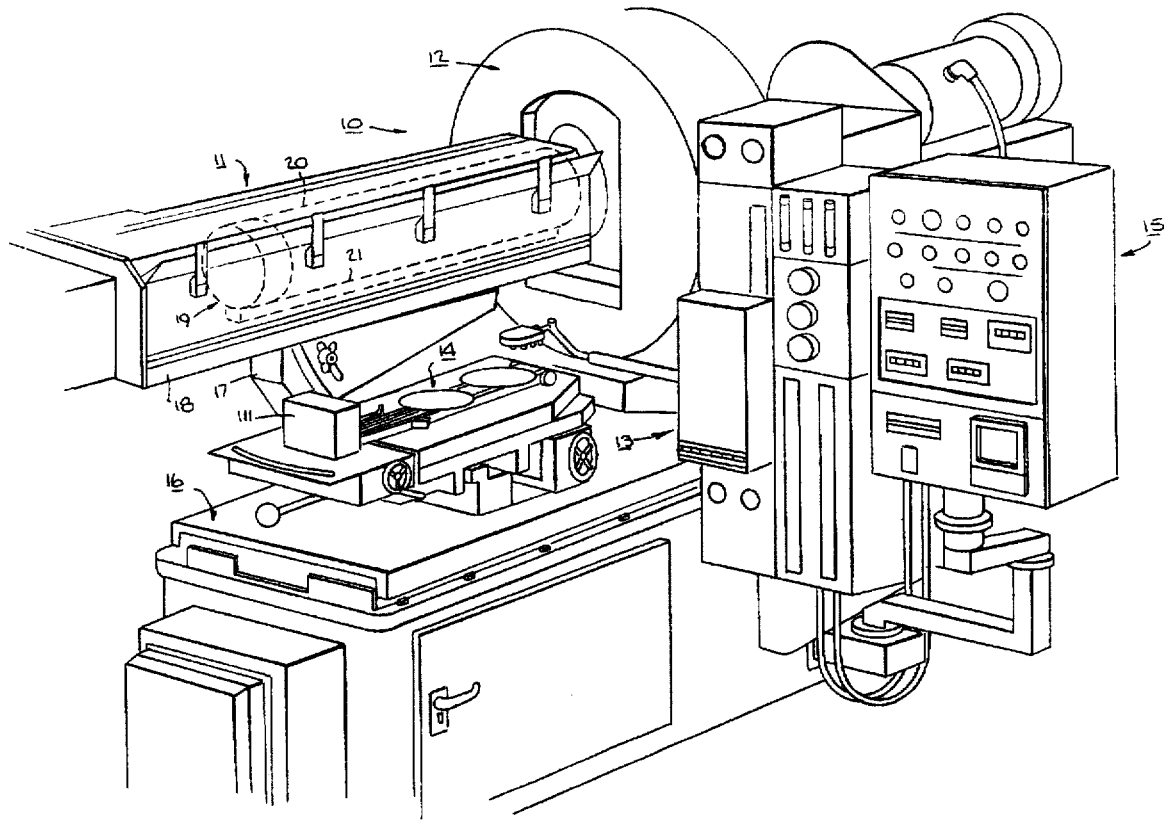

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 4–19, 21, 23–25, 27–39 is confirmed.

Claims 1–3, 20, 22 & 26 were previously cancelled.

* * * * *